US010686779B2

(12) United States Patent
Glozman et al.

(10) Patent No.: US 10,686,779 B2
(45) Date of Patent: Jun. 16, 2020

(54) ESTABLISHING AN AD-HOC SECURE CONNECTION BETWEEN TWO ELECTRONIC COMPUTING DEVICES USING A SELF-EXPIRING LOCALLY TRANSMITTED INFORMATION PACKET

(71) Applicant: Beame.io Ltd., Tel Aviv (IL)

(72) Inventors: Zeev Glozman, Gainesville, FL (US); Markus Neff, Ottobrunn (DE)

(73) Assignee: BEAME.IO LTD., Tel Aviv (IL)

( * ) Notice: Subject to any disclaimer, the term of this patent is extended or adjusted under 35 U.S.C. 154(b) by 0 days.

(21) Appl. No.: 16/303,214

(22) PCT Filed: Jan. 29, 2018

(86) PCT No.: PCT/IL2018/050098
§ 371 (c)(1),
(2) Date: Nov. 20, 2018

(87) PCT Pub. No.: WO2018/138729
PCT Pub. Date: Aug. 2, 2018

(65) Prior Publication Data
US 2020/0053072 A1 Feb. 13, 2020

Related U.S. Application Data

(63) Continuation-in-part of application No. PCT/IL2017/050103, filed on Jan. 29, 2017.

(51) Int. Cl.
*H04L 29/06* (2006.01)
*G06F 21/36* (2013.01)
(Continued)

(52) U.S. Cl.
CPC .......... *H04L 63/0823* (2013.01); *G06F 21/36* (2013.01); *H04L 9/3247* (2013.01); *H04L 63/0428* (2013.01); *H04W 12/06* (2013.01)

(58) Field of Classification Search
None
See application file for complete search history.

(56) References Cited

U.S. PATENT DOCUMENTS

2011/0185171 A1* 7/2011 Karasawa ............... G06F 21/33
713/156
2012/0311686 A1* 12/2012 Medina ............... H04L 63/0807
726/7
(Continued)

FOREIGN PATENT DOCUMENTS

EP 2790387 A1 10/2014

OTHER PUBLICATIONS

Panton et al., "Secure Proximity-Based Identity Pairing using an Untrusted Signalling Service", 13th IEEE Annual Consumer Communications & Networking Conference (CCNC), Jan. 9, 2016 (Year: 2016).*

(Continued)

*Primary Examiner* — Henry Tsang
(74) *Attorney, Agent, or Firm* — Middleton Reutlinger

(57) ABSTRACT

Disclosed is a computer-implemented method for establishing a secure connection between two electronic computing devices which are located in a network environment, the two electronic computing devices being a first computing device offering the connection and a second computing device designated to accept the connection, the method comprising executing, by at least one processor of at least one computer, a connection-establishing application for exchanging an information packet between the first computing device and the second computing device comprising a secret usable for establishing the connection, and evaluating a response from the second computing device for establishing the secure connection.

14 Claims, 3 Drawing Sheets

(51) Int. Cl.
*H04L 9/32* (2006.01)
*H04W 12/06* (2009.01)

(56) References Cited

U.S. PATENT DOCUMENTS

| | | | | |
|---|---|---|---|---|
| 2013/0145151 A1* | 6/2013 | Brown | .................. | H04L 9/3268 |
| | | | | 713/156 |
| 2014/0298415 A1* | 10/2014 | Xie | ..................... | H04L 61/2589 |
| | | | | 726/3 |
| 2018/0159856 A1* | 6/2018 | Gujarathi | ............ | H04L 63/0281 |
| 2019/0074982 A1* | 3/2019 | Hughes | ................ | H04L 9/3268 |

OTHER PUBLICATIONS

Pala et al., "PorKI: Portable PKI Credentials via Proxy Certificates", Network and Parallel Computing, Sep. 23, 2010 (Year: 2010).*
Panton et al. "Secure Proximity-Based Identity Pairing using an Untrusted Signalling Service". 13th IEEE Annual Consumer Communications & Networking Conference (CCNC). Jan. 9, 2016.
Pala et al. "PorKI: Portable PKI Credentials via Proxy Certificates". Network and Parallel Computing. Sep. 23, 2010.
International Search Report and Written Opinion for PCT Application No. PCT/IL2018/050098 dated Apr. 10, 2018.

* cited by examiner

ESTABLISHING AN AD-HOC SECURE CONNECTION BETWEEN TWO ELECTRONIC COMPUTING DEVICES USING A SELF-EXPIRING LOCALLY TRANSMITTED INFORMATION PACKET

The present invention relates to a computer-implemented method for establishing a secure connection between two electronic computing devices which are located in a network environment, the two electronic computing devices being a first computing device offering the connection and a second computing device designated to accept the connection.

TECHNICAL BACKGROUND

It has been long sought to generate a trusted connection to/with digital electronic devices located on residential, enterprise and office networks not being able to receive inbound connections which basically has three solutions:
1. manual router configuration with port forwarding;
2. UnPNP which is supported in residential and sometimes enterprise systems, but not supported at all on mobile systems. (see for example www.en.wikipedia.org/wiki/Carrier-grade_NAT); and
3. Use of persistent outbound connections, polling, and special event synchronization techniques most be employed in order for it to function.

In a mobile environment connected on 3/4G there is no way to receive an inbound connection at all.

While cell phone provider networks provide Internet access for mobile end users, it is not allowed to connect to devices behind an NAT (network address translation) router, i.e. the devices are inaccessible for inbound TCP connections from the Internet.

Further prior art is contained in "Enabling Push-based Mobile Web Services for Today's Cell Phone Provider Networks" by Sascha Roth of the Department of Computer Science at Hochschule Darmstadt—University of Applied Sciences, Germany. (available at www.cscan.org/default.asp?page=openaccess&eid=2&id=128).

According to Bryan Ford Massachusetts Institute of Technology (available at www.brynosaurus.com/pub/net/p2pnat/) there are a few additional known methods of establishing connectivity between private devices (behind a NAT):
1. message relaying: the most reliable—but least efficient—method of P2P communication across network address translation (NAT) is simply to make the communication look to the network like standard client/server communication, through relaying. Suppose two client hosts A and B have each initiated TCP or UDP (user datagram protocol) connections to a well-known server S, at the global IP address 18.181.0.31 of S and port number 1234. As shown in FIG. 1 the clients reside on separate private networks, and their respective NATs prevent either client from directly initiating a connection to the other. Instead of attempting a direct connection, the two clients can simply use the server S to relay messages between them. For example, to send a message to client B, client A simply sends the message to server S along its already-established client/server connection, and server S forwards the message on to client B using its existing client/server connection with B.
This is the method which is mostly employed today.
The limitation of this method is knowledge of the "1234" port. The concept of a message suggests an existence of a higher level protocol, which can define message structure and syntax, otherwise the relay will not know when to stop reading data, as well as to which one of all the attached clients the data needs to be delivered to.
Either way, this method makes it impossible for one of the devices to be a standard based application such as a standard web browser, which makes usage of browser security impossible.
In addition, there are limitations to this technique due to mandating a single known open port, as well as both devices A and B are required to speak the same protocol. This limits the scope of such connection to only context of a given software application. Further limitations of message relaying are:
Both devices need to know the endpoint of the servers.
Both devices need to know the public keys of the server (e.g. TeamViewer®).
Custom protocol needs to exist and therefore only applications implementing this protocol can connect. This rules out all existing software which includes a web browser as a solution to reaching the aforementioned object.
2. hole-punching: The inventors consider this not a reliable method, as it relies on weakness of the implementation of NAT, typically NAT on small size routers does not keep a table of connections but rather operates on port level. So when device A opens a connection to a well-known server, it inadvertently allocates a public port to that specific connection to be able to receive traffic from the original connection target. Now the known public server lets device b know what that port is, and now device B starts talking to device A.
3. universal plug-and-play—UnPnP this protocol relies on IP multicast messages, which is limited only to residential and small offices, as carriers use different NAT with different port allocation algorithms, and do not support UnPnP for transmission control protocol (TCP) connections.

A connection between an application running in a browser stack, and an application in another browser stack or between a browser stack and a native mobile client in a secure manner that is secured end2end using native browser technologies is simply not possible with any of the technologies described above.

An outline of a prior art method for connection build-up is given by FIG. 1.

Panton T. et al., "Secure proximity-based identity pairing using an untrusted signalling service", 2016 $13^{TH}$ IEEE ANNUAL CONSUMER COMMUNICATIONS & NETWORKING CONFERENCE (CCNC), IEEE, 9 Jan. 2016 (2016-01-09), pages 942-947, XP032887061, DOI: 10.1109/CCNC.2016.7444914 discloses a proximity-based pairing scheme that uses a signalling service to minimize the trust requirements on a third party, achieving anonymity and avoiding the need for a public key infrastructure, while still requiring only a simple asymmetric pairing protocol.

An object of the invention therefore is to provide a method of generating a secure connection to/with a digital electronic device located on a private network space.

Aspects of the present invention, examples and exemplary steps and their embodiments are disclosed in the following. Different advantageous features can be combined in accordance with the invention wherever technically expedient and feasible.

EXEMPLARY SHORT DESCRIPTION OF THE PRESENT INVENTION

In the following, a short description of the specific features of the present invention is given which shall not be understood to limit the invention only to the features or a combination of the features described in this section.

The disclosed method encompasses building a secure tunnel between two computing devices using standard TLS for end to end encryption using on-the-fly (dynamic) generation of a device identification which has time-limited validity and is used for establishing the secure connection (tunnel). The device identification is a representative of a publicly not accessible device (within this disclosure also called a private device) which is connected—in a digital network—to an accessible server (within this disclosure also called public or global node) but cannot be accessed from a public network via its IP address. The short-lived random device identification is a random ID and an ephemeral private key generated on the device. The unique ID (unique identifier) and public key as well as signature of the unique ID are advertised to the publicly accessible server. The public server is configured to relay messages between the two devices based on the device ID, and the public server is considered untrusted, and only functions as a transparent message relay. It is important to understand that one device is equipped with an application (such as a mobile app), and the other may be running a web browser. A secure connection can be established via the device identification between the publicly not accessible device and the device in the public network, using the publicly accessible server as a gateway for the secure connection. Technically, the device identification is a publicly known, dynamic Full Qualified Domain Name (an URL that can e.g. be typed into a browser address bar) which can be resolved by DNS (Domain Name System) to a public IP address of the public relay/proxy server but belonging to the private device, where the public relay/proxy server does not terminate encryption. One way of physical transmission of the device identification to the mobile device (smartphone) may be to display the information as a two-dimensional graphical code (e.g. a QR code, or a barcode) on a display of the device with which a connection shall be established from the mobile device. An alternative way of transmission may be by other means of local communication such as NFC (near field communication) or sound encoding. The proposed method also eliminates common man in the middle attacks, as it begins with an ephemeral key.

GENERAL DESCRIPTION OF THE PRESENT INVENTION

In this section, a description of the general features of the present invention is given for example by referring to possible embodiments of the invention.

In general, the invention reaches the aforementioned object by providing, in a first aspect, a computer-implemented method for establishing a secure connection between two electronic computing devices which are located in a network environment. The two electronic computing devices are a first computing device offering the connection and a second computing device designated to accept the connection. The method comprises executing, by at least one processor of at least one computer, a connection-establishing application, wherein execution of the connection-establishing application causes the at least one processor of the at least one computer executing the following steps.

In a (for example, first) exemplary step, an ephemeral private key is generated by the connection-establishing application and its ephemeral public key is derived, and a unique ID (UID) is generated by means of the connection-establishing application. Within the framework of this disclosure, the abbreviation ID means identifier or identification.

In a (for example, second) exemplary step, the unique ID is submitted to a trusted server for an additional signature with the private key matching a publicly trusted certificate associated with the trusted server.

In a (for example, third) exemplary step, the signed unique ID is sent back to the first computing device.

In a (for example, fourth) exemplary step, a virtual endpoint is registered on a relay server with the signed unique ID, whereby the signed unique ID becomes a signed unique ID of the virtual endpoint.

In a (for example, fifth) exemplary step, an information packet is acquired from the first computing device and at the second computing device. The information packet comprises information about:
i. a network configuration of the first computing device comprising
  1. the signed unique ID of the virtual endpoint on the relay server; and
  2. an address of the relay server;
ii. the ephemeral public key;
iii. a fully qualified domain name of the trusted server; and
iv. a signature associated with the signed unique ID.

In a (for example, sixth) exemplary step, it is determined, by the second computing device, whether the signature associated with the signed unique ID is valid and trusted. This determination may be implemented by steps known to the person skilled in the art, for example by evaluating the instance issuing the signature or an expiry time of the signature.

If this signature check results in that the unique ID signature is valid and trusted, the method continues with a (for example, seventh) exemplary step comprising establishing a connection from the second computing device to the first computing device via the virtual endpoint by means of a transparent relay through the relay server.

In a (for example, eighth) exemplary step, an information packet response is received at the first computing device and from the second computing device. The information packet response is a response of the second computing device to the acquisition of the information packet. The information packet response is encrypted with the ephemeral public key. The information packet response is transferred through the relay server by the second computing device and decrypted using the ephemeral private key, preferably decrypted by the first computing device. The information packet response contains the following:
i. the address of the relay server;
ii. a unique authorization token (for example, usage of the authorization token requires possession of the ephemeral public key, specifically so that the unique authorization token may be decrypted—for example, the unique authorization token is encrypted with the ephemeral public key) which is for example located on the first computing device;
iii. a cryptographic checksum of a publicly trusted certificate associated with a private key of the second computing device, with the relay server address (i.e. the address of the relay server) contained in the common name or alternate names of the publicly trusted certificate associated with the second computing device (e.g. with the private key of the second computing device); and iv. a signature generated using the private key corresponding to the publicly trusted certificate associated with the second computing device, the signature signing the address of the relay server, the unique authorization token and the cryptographic checksum of the publicly trusted certificate associated with the second computing device.

In a (for example, ninth) exemplary step, it is determined, by the first computing device, whether the publicly trusted certificate associated with the second computing device is valid (meaning e.g. that the certificate chain is correct according to e.g. RFC 5280 and the certificate is authorized by the same trusted server as in the for example second exemplary step). This may be done for example by determining whether an expiry time of the publicly trusted certificate has been reached or if the fingerprint of the certificate is not present in an application trust database, and if so, the publicly trusted certificate will be considered invalid. The implementation of the validation of the public certificate may also be implemented according to a set of public internet standards (RFCs) like RFC 5280, RFC 4158, RFC 6125, RFC 6960 and RFC 6962.

In a (for example, tenth) exemplary step, the signature contained in the information packet response is verified by validating the signature contained in the information packet response against a public key obtained from the publicly trusted certificate, wherein the publicly trusted certificate is associated with for example the second computing device (e.g. with the private key of the second computing device) and has been retrieved from a trusted source. This verification may be implemented by steps known to the person skilled in the art.

If the verification of the information packet response results in that the information packet response is valid, the method continues with a (for example, eleventh) step comprising initiating a secure connection to the second computing device.

In a (for example, twelfth) exemplary step, a proof of possession of the ephemeral private key is provided by generating a signature signing, with the ephemeral private key, information shared between the first computing device and the second computing device. The shared information may be essentially any trusted and shared information such as a shared address (e.g. a uniform resource locator) which is unique to the current session. In one specific embodiment, the URL addressed/called by the HTTPS request is the URL representing the second computing device on the relay server. In specific examples, the shared information may be the information packet or at least a part of the information packet and/or the unique authorization token. This signature is included in the connection request to the second computing device to act as a unique authorization token together with the shared information. The disclosed method uses several different tokens, namely two different unique authorization tokens (step eight and step twelve), one for each direction of the connection setup phase and one session token (step thirteen).

In a (for example, thirteenth) exemplary step, the connection is accepted by the second computing device, and further data exchange between the two computing devices is allowed by executing the following steps:

i. receiving, at the second computing device, a hypertext transfer protocol secure request with the unique authorization token;

ii. verifying the proof of possession of the ephemeral private key by verifying the signature generated by signing the shared information, and thereby granting permanent means of authentication, namely a session token signed with the private key corresponding to the publicly trusted certificate associated with the second computing device, and granting access to resources available by means of the second computing device; and iii. authorizing, by the second computing device, the secure connection from the first computing device.

In one example of the disclosed method, the second computing device is a mobile electronic device such as a smartphone or a tablet computer. In one specific variant of this example, the mobile electronic device includes a digital electronic processor and an optical image acquisition unit operatively coupled to the processor of the mobile electronic device and wherein the first computing device is operatively coupled to a display device, wherein the first computing device causes the display device to display a two-dimensional graphical code such as a QR code or barcode representing the information packet. The method may then comprises a step of generating, by the mobile electronic device, the information packet based on digital image data obtained by scanning, with the image acquisition unit, the graphical code displayed on the display device.

In one example of the disclosed method, the second computing device is a mobile electronic device such as a smartphone or a tablet computer. In one specific variant of this example, the mobile electronic device includes a digital electronic processor and an acoustic acquisition unit operatively coupled to the processor of the mobile electronic device and wherein the first computing device is operatively coupled to a sound emitting device, wherein the first computing device causes the sound emitting device to emit an acoustic code such as an unique ultrasound code representing the information packet. The method may then comprise a step of re-producing, by the second computing device, the information packet content based on the acoustic data obtained by recording, with the acoustic acquisition unit such as a microphone, the acoustic code being emitted by the first computing device.

In one example of the disclosed method, if exemplary steps eight, nine or tenor a combination thereof results in that the information packet response
- cannot be decrypted with the ephemeral private key of the first computing device; or
- results in a non-valid and non-trusted identity of the second computing device, then further data exchange is prohibited between the first computing device and the second computing device, and the connection is terminated.

In one example, the disclosed method comprises executing, by the at least one processor of the at least one computer, a step of transmitting digital data between the first computing device and the second computing device via the secure connection.

In one example of the disclosed method, the first computing device and the second computing device are located in separate network spaces which are separated from each other through at least one of a firewall, proxy server and/or NAT (network address translation) or other similar restrictive means so that no direct connection initiation is possible. The method may then comprise a step of establishing a connection between the second computing device and the relay server. All data exchanged between the first computing device and the second computing device is then routed via the relay server. All data transmitted between the first computing device and the second computing device is then asymmetrically encrypted using the either the ephemeral public key and or the public key corresponding to the publicly trusted certificate associated with the second computing device depending on the direction of communication.

In one example of the disclosed method, the first computing device and the second computing device share a network space, and all data exchanged between the first computing device and the second computing device is routed directly between the first computing device and the second computing device.

In one example of the disclosed method, the first computing device causes the transmission of the information packet or trustworthy reference thereof by transmission of at least one of QR (quick response) code, ultrasound code, Bluetooth connection, a near-field communication connection (NFC) or barcode.

In one example of the disclosed method, the second computing device is operative in a public mobile network operating on a standard such as 3G, 4G or 5G or in a private network (e.g. a wireless network in hospital). In one variant of this example, the private network is a local network.

In one example of the disclosed method, the information packet response contains a CN (X.509/SSL certificate common name) which matches a certificate being allocated to second computing device.

In one example of the disclosed method, the publicly trusted certificate, for example the TLS certificate, is an X509 certificate.

In one example of the disclosed method, the method comprises steps of placing specific hypertext transfer protocol (HTTP) public key pinning headers into a hypertext transfer protocol response by the second computing device, and causing a web browser on the first computing device to remember the public key corresponding to the publicly trusted certificate associated with the second computing device matching the address of the relay server for preventing attacks in future sessions between the first computing device and the second computing device. In one variant of this example, the hypertext transfer protocol public key pinning headers are defined according to the RFC7469 standard.

In one example of the disclosed method, the application is a web application.

In one example of the disclosed method, the unique ID is a random unique ID.

In one example of the disclosed method, the trusted server is a hypertext transfer protocol secure server.

In one example of the disclosed method, the address of the relay server is a fully qualified domain name (FQDN).

In one example of the disclosed method, the virtual endpoint is secret and dynamically allocated.

In one example of the disclosed method, the information packet and information packet response contain a signed time stamp for further control of response validity. For example, the validity of the information packet may be determined, as part of the disclosed method, by comparing a current time to the time stamp contained in the information packet response. The time stamp may define at least one of a time at which the information packet was generated, a length of time after the generation for which the information packet is considered to be valid, or an absolute time by which the information packet is considered to be invalid (i.e. the information packet is considered to be invalid if the absolute point in time has been reached). In this sense, the information packet may be said to be self-expiring because it loses its validity if the evaluation of the time stamp reveals that the information packet is invalid.

In one example of the disclosed method, the address of the relay server assigned to the second computing device is a fully qualified domain name.

In one example of the disclosed method, the unique authorization token is part of a cryptographic challenge or just a message encrypted with the ephemeral public key.

In one example of the disclosed method, the trusted source from which the publicly trusted certificate can be retrieved is an Origin server or Certificate Transparency Log or the Certification Authority issuing the certificate.

In one example of the disclosed method, no initial web page download is required because the application can be pre-deployed to all involved devices.

In one example of the disclosed method, the connection-establishing application is already stored on the two computing devices. In one variant of this example, the connection-establishing application is simultaneously stored and executable on both of the two computing devices. For example, the connection-establishing application may be executed on both of the computing devices at least substantially simultaneously and/or with an overlap in time so that each of the two computing devices performs the steps required for it to participate in execution of the disclosed method. At least that part of the application which is required for participation of the respective one of the first computing device and the second computing device in execution of the disclosed method may be run on (only) the respective one of the first computing device and the second computing device.

In one example of the disclosed method, a web application is used to establish a connection to a trusted server from the first computing device, and the method comprises a step of downloading an application-specific webpage. In one variant of the example, the web application comprises (for example, is) the connection-establishing application. Then, the connection to the trusted server may be established by means of a HTTPS/TLS (hypertext transfer protocol secure/transport layer security) protocol.

In one example of the disclosed method, the ephemeral private key is frequently refreshed along with the information packet. This may be done so that the security is increased.

In one example of the disclosed method, the unique authorization token is the information in the information packet response that serves to verify a cryptographic identity of an electronically communicating electronic device. In one variant of this example, the unique token is the whole information packet response encrypted with the corresponding public key.

If exemplary step ten results in that the signature contained in the information packet response is not valid or information decryption with the ephemeral private key does not result in valid decryption of data, or the endpoint has previously been associated with another computing device, or the information packet is expired, the disclosed method may comprise steps of prohibiting further data exchange between the first and second computing devices and dropping the secure connection.

In a second aspect, the invention relates to a computer program, which, when executed by at least one processor of at least one computer or loaded into a memory of at least one computer, causes the at least one computer to execute the method according to the first aspect. Alternatively or additionally, the invention according to the second aspect relates to a data stream which represents the aforementioned program. Further alternatively, or additionally, the invention according to the second aspect relates to a signal wave or a digital signal wave, carrying information which represents the aforementioned program.

In a third aspect, the invention relates to a non-transitory computer-readable program storage medium on which a program is stored, when running on a processor of at least one computer or when loaded into the memory of at least one computer, causes the at least one computer to perform the method according to the first aspect.

In a fourth aspect, the invention relates to a system, comprising:
at least one computer comprising a processor and a memory; and
the program storage medium according to third aspect, wherein
the at least one computer is configured to read the program from the program storage medium and execute the program.

In a fifth aspect, the invention relates to an electronic network system, comprising:
a) a first computing device and a second computing device; and
b) the system according to the fourth aspect, wherein the at least one computer can be part of at least one of the first computing device and the second computing device.

It is within the scope of the present invention to combine one or more features of one or more embodiments or aspects of the invention in order to form a new embodiment wherever this is technically expedient and/or feasible. Specifically, a feature of one embodiment which has the same or a similar function to another feature of another embodiment can be exchanged with said other feature, and a feature of one embodiment which adds an additional function to another embodiment can for example be added to said other embodiment.

Definitions

In this section, definitions for specific terminology used in this disclosure are offered which also form part of the present disclosure.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, for example computer-readable data storage medium comprising computer-usable, for example computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, for example a data processing device comprising a digital processor (central processing unit or CPU) which executes the computer program elements, and optionally a volatile memory (for example a random access memory or RAM) for storing data used for and/or produced by executing the computer program elements. Within the framework of the present invention, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can for example include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). For the purpose of this document, a computer is a technical computer which for example comprises technical, for example tangible components, for example mechanical and/or electronic components. Any device mentioned as such in this document is a technical and for example tangible device.

The method in accordance with the invention is for example a computer implemented method. For example, all the steps or merely some of the steps (i.e. less than the total number of steps) of the method in accordance with the invention can be executed by a computer (for example, at least one computer). An embodiment of the computer implemented method is a use of the computer for performing a data processing method. An embodiment of the computer implemented method is a method concerning the operation of the computer such that the computer is operated to perform one, more or all steps of the method.

The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating or determining steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing (medical) imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is a virtual reality device or an augmented reality device (also referred to as virtual reality glasses or augmented reality glasses) which can be used as "goggles" for navigating. A specific example of such augmented reality glasses is Google Glass (a trademark of Google, Inc.). An augmented reality device or a virtual reality device can be used both to input information into the computer by user interaction and to display information outputted by the computer. Another example of a display device would be a standard computer monitor comprising for example a liquid crystal display operatively coupled to the computer for receiving display control data from the computer for generating signals used to display image information content on the display device. A specific embodiment of such a computer monitor is a digital lightbox. An example of such a digital lightbox is Buzz®, a product of Brainlab AG. The monitor may also be the monitor of a portable, for example handheld, device such as a smart phone or personal digital assistant or digital media player.

In a an exemplary aspect, the invention is directed to a computer program which, when running on at least one processor (for example, a processor) of at least one computer (for example, a computer) or when loaded into at least one memory (for example, a memory) of at least one computer (for example, a computer), causes the at least one computer to perform the above-described method according to the first aspect. The invention may alternatively or additionally relate to a (physical, for example electrical, for example technically generated) signal wave, for example a digital signal wave, carrying information which represents the program, for example the aforementioned program, which for example comprises code means which are adapted to perform any or all of the steps of the method according to the first aspect. A computer program stored on a disc is a data file, and when the file is read out and transmitted it becomes a data stream for example in the form of a (physical, for example electrical, for example technically generated) signal. The signal can be implemented as the signal wave which is described herein. For example, the signal, for example the signal wave is constituted to be transmitted via a computer network, for example LAN, WLAN, WAN, mobile network, for example the internet. For example, the signal, for example the signal wave, is constituted to be transmitted by optic or acoustic data transmission. The invention according to the second aspect therefore may alternatively or additionally relate to a data stream representing the aforementioned program.

The expression "acquiring data" for example encompasses (within the framework of a computer implemented method) the scenario in which the data are determined by the computer implemented method or program. Determining data for example encompasses measuring physical quantities and transforming the measured values into data, for example digital data, and/or computing (and e.g. outputting) the data by means of a computer and for example within the framework of the method in accordance with the invention. The meaning of "acquiring data" also for example encompasses the scenario in which the data are received or retrieved by (e.g. input to) the computer implemented method or program, for example from another program, a previous method step or a data storage medium, for example for further processing by the computer implemented method or program. Generation of the data to be acquired may but need not be part of the method in accordance with the invention. The expression "acquiring data" can therefore also for example mean waiting to receive data and/or receiving the data. The received data can for example be inputted via an interface. The expression "acquiring data" can also mean that the computer implemented method or program performs steps in order to (actively) receive or retrieve the data from a data source, for instance a data storage medium (such as for example a ROM, RAM, database, hard drive, etc.), or via the interface (for instance, from another computer or a network). The data acquired by the disclosed method or device, respectively, may be acquired from a database located in a data storage device which is operably to a computer for data transfer between the database and the computer, for example from the database to the computer. The computer acquires the data for use as an input for steps of determining data. The determined data can be output again to the same or another database to be stored for later use. The database or database used for implementing the disclosed method can be located on network data storage device or a network server (for example, a cloud data storage device or a cloud server) or a local data storage device (such as a mass storage device operably connected to at least one computer executing the disclosed method). The data can be made "ready for use" by performing an additional step before the acquiring step. In accordance with this additional step, the data are generated in order to be acquired. The data are for example detected or captured (for example by an analytical device). Alternatively or additionally, the data are inputted in accordance with the additional step, for instance via interfaces. The data generated can for example be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. In particular, the acquiring step does not involve an invasive step which would represent a substantial physical interference with the body, requiring professional medical expertise to be carried out and entailing a substantial health risk even when carried out with the required professional care and expertise. In particular, the step of acquiring data, for example determining data, does not involve a surgical step and in particular does not involve a step of treating a human or animal body using surgery or therapy. In order to distinguish the different data used by the present method, the data are denoted (i.e. referred to) as "XY data" and the like and are defined in terms of the information which they describe, which is then preferably referred to as "XY information" and the like.

DESCRIPTION OF THE FIGURES

In the following, the invention is described with reference to the appended figures which represent a specific embodiment of the invention. The scope of the invention is however not limited to the specific features disclosed in the context of the figures, wherein.

First, a short outline of the properties of the present invention will be presented. Specifically, the invention relates to:
1. Generation of a single-session use on-demand dynamically created endpoint.
2. Encoding of the endpoint as well as devices and public keys in the self-expiring information packet that can be transmitted between devices in one physical step (for example: QR scan or transmission of an ultrasound code).
3. Generation of a single-session use, on-demand, dynamically created, secure tunnel connection between the first and the second computing device.

Figure 1:
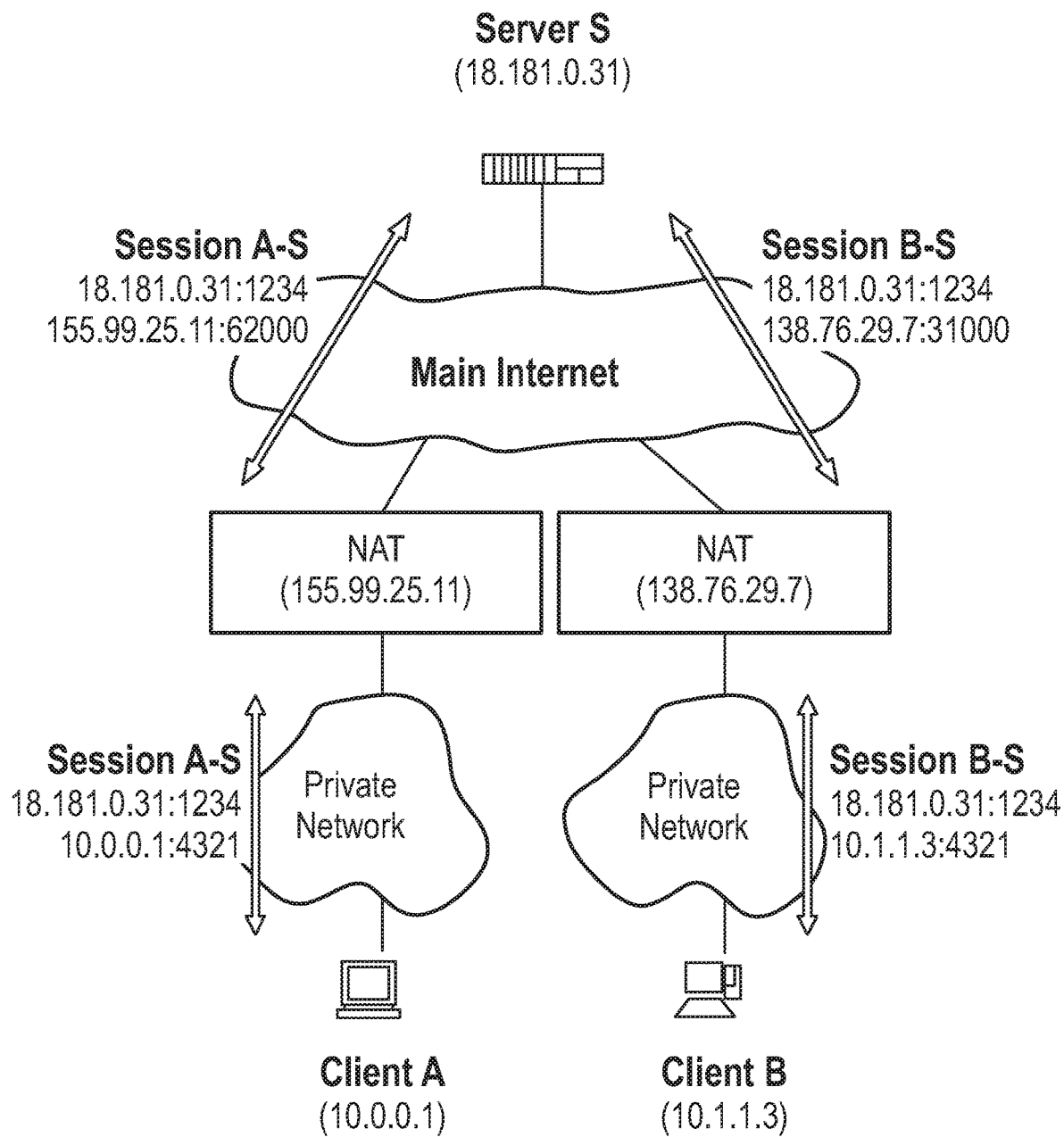
FIG. 1 is an illustration of connection generation according to the prior art.
Figure 2:
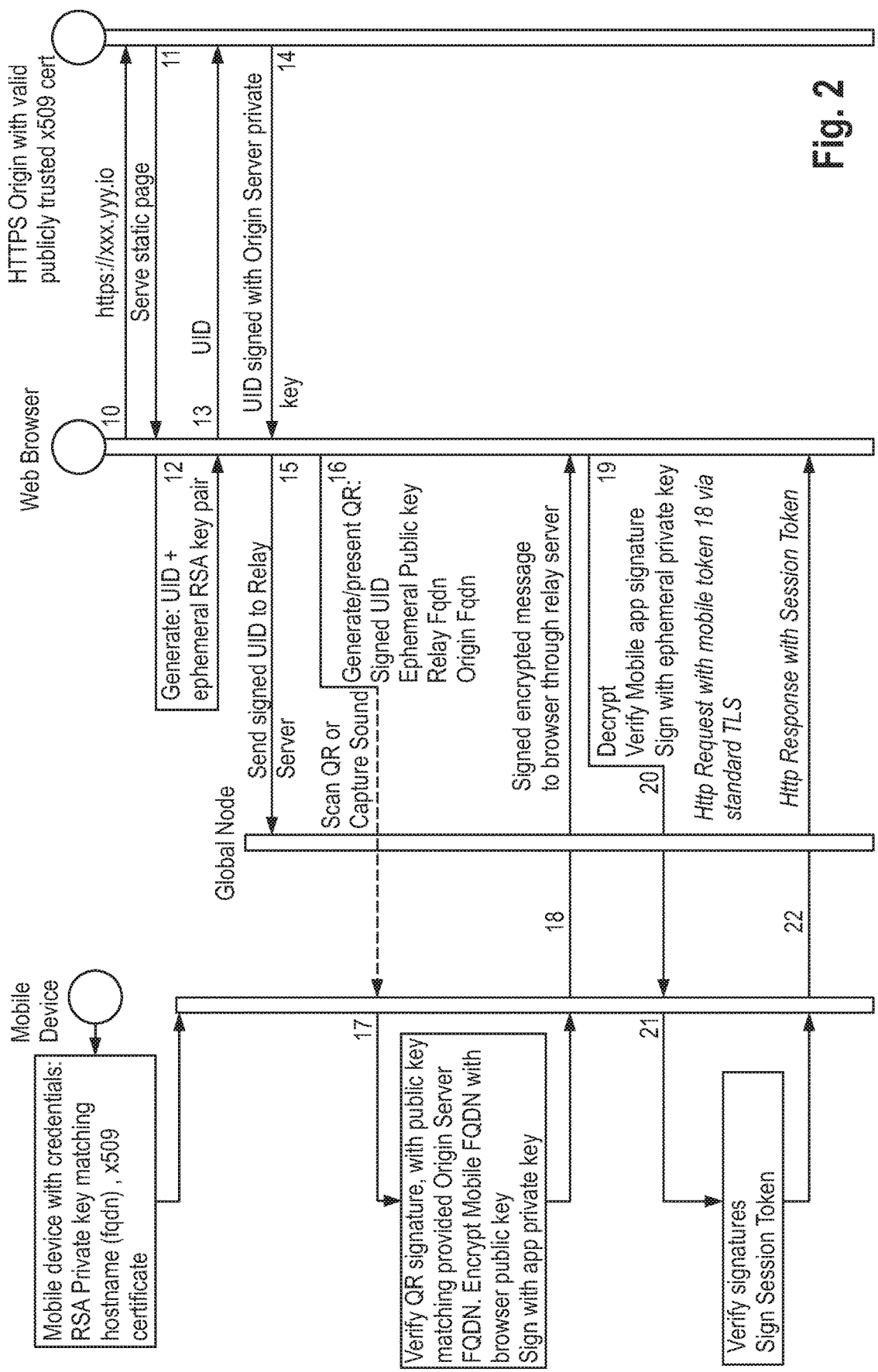
FIG. 2 illustrates a setup of the secure connection between two devices: a second computing device embodied by a mobile device and a first computing device running a web browser.
Figure 3:
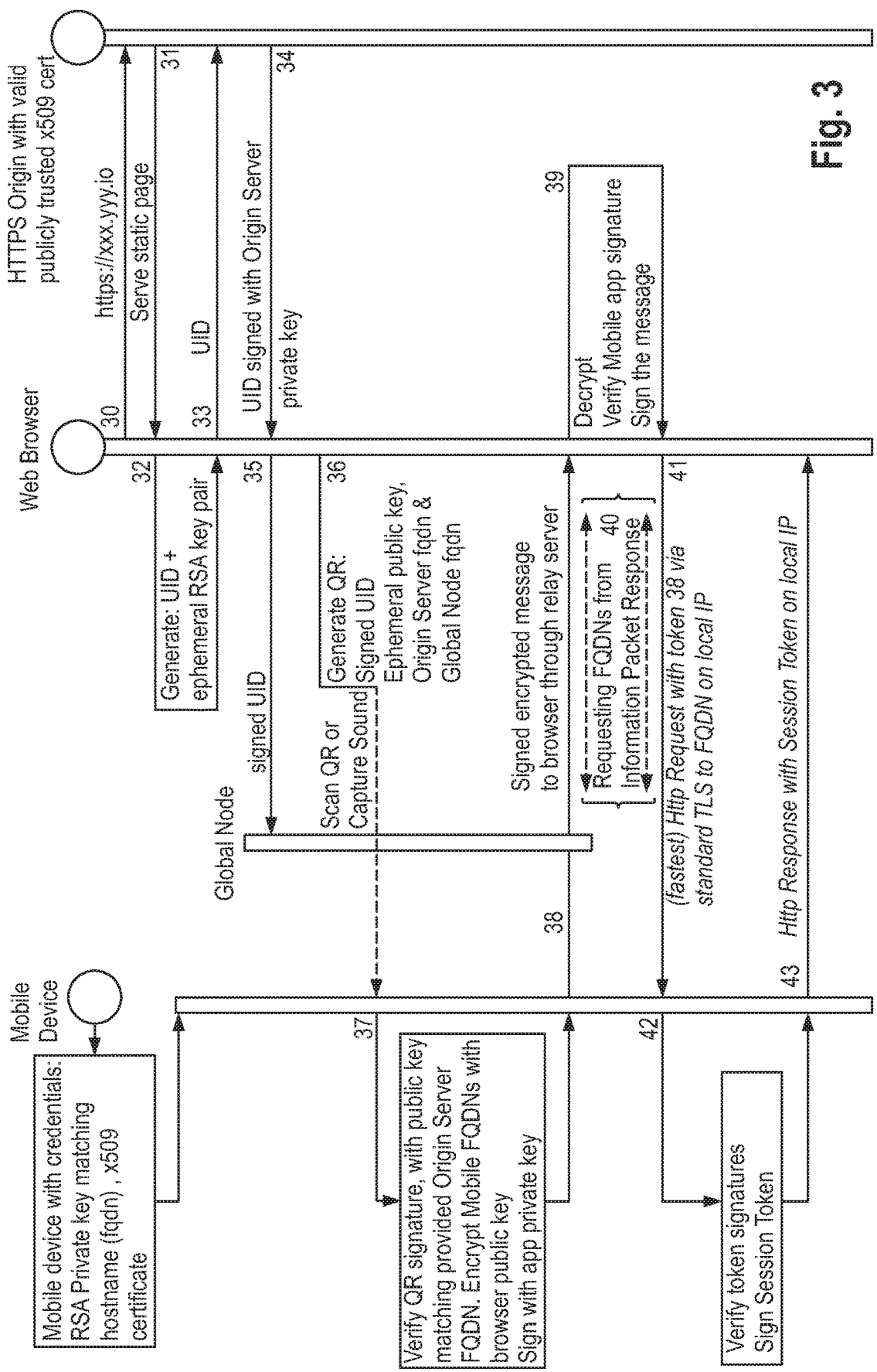
FIG. 3 illustrates a setup of the secure connection between two devices: a second computing device embodied by a mobile device and a first computing device running a web browser, the two devices sharing the same network space.

A specific embodiment of the disclosed method may in short be described as a mechanism of using multiple outbound connections from non-public devices (such as mobile devices on 3G networks) to a common public relaying proxy-router to create multiple virtual TCP connections based on information read through a dynamically generated self-expiring Information Packet, containing the virtual device endpoints data. The information packets are delivered through a local and physical connection between the devices, such as QR code (quick response code), barcode, NFC, or ultrasound code. The process of public endpoint allocation and connection initiation is represented by FIGS. 2 and 3, both describing different scenarios. In FIG. 2 both computing devices reside in different networks, whereas in FIG. 3 both computing devices reside in the same network.

The following is a description of the steps shown in FIG. 2, that represents session establishment between two devices located in separate network spaces:

Step 10 (initial): The first computing device (web browser) requests the Origin Server through a regular HTTPS session; the address of the Origin server needs to be known only to the first computing device.

Step 11: Origin server serves static page to the Web Browser

Step 12: The first computing device (web browser) generates a unique ID (UID) and an ephemeral RSA key pair, and stores the private key in a local store to be associated with the (future) information packet.

Step 13: The first computing device (web browser) sends the unique ID to the Origin Server.

Step 14: The Origin Server signs the public key of the first computing device (web browser) and the unique ID with its own private key and sends it back to the first computing device (web browser).

Step 15: The first computing device (web browser) sends signed virtual endpoint information (the signed unique ID) to the relay server (global node)

Step 16: The first computing device (web browser) generates and/or presents the information packet containing: the signed unique ID, the ephemeral public key; relay server fully qualified domain name, and the Origin Server fully qualified domain name.

Step 17: The second computing device (running a mobile application/app) receives the information packet (for example scans it as a QR code or captures it as an ultrasound code), verifies the QR/ultrasound signature of the information packet by matching the signature with the public key, and encrypts its own fully qualified domain name with the ephemeral public key from the information packet, and signs it with its own private key.

Step 18: The second computing device (e.g. mobile app) sends the information packet response to the first computing device (e.g. web browser) through the Relay Server (Global Node).

Step 19: The first computing device (web browser) decrypts the information packet response, verifies the signature of the second computing device (the signature of the mobile app), and signs the information packet response with the ephemeral private key (the token).

Step 20: The first computing device (web browser) makes a HTTPS request through the global node to the mobile FQDN (the fully qualified domain name of the second computing device) contained in the information packet response, with the token from step 19 set in a HTTP header (through the Global Node)

Step 21: The second computing device (the mobile app) verifies signatures in the token contained in the HTTP header.

Step 22: If step 21 was successful, the second computing device (the mobile app) sends an HTTP response with the token (though the global node). The token is, from that point, considered a session token, and an HTTPS session (representing the secure connection) is considered established.

FIG. 3 illustrates connection setup for the case of the first computing device and the second computing device sharing the same network space. The following is the description of session setup in such a scenario.

Steps 30 to 39 are the same as steps 10 to 19 described in the context of FIG. 2 above.

Step 40: The first computing device (the web browser) sends requests to all FQDNs that are received in the information packet response. Considering that the order of FQDNs in the response is such that local FQDNs that will be resolved to local IP addresses are placed first, FQDNs corresponding to local IP addresses are expected to answer first.

Step 41: This step shows a successful HTTPS request from step 40: the first computing device (the web browser) signs the received information packet response with its ephemeral private key (the token) and makes a direct HTTPS request with the token set in a HTTP header to the fastest FQDN (here: local IP).

Step 42 (is equal to step 21 of FIG. 2): The second computing device (the mobile app) verifies the signatures in the token contained in the HTTP header.

Step 43: If step 42 was successful, the second computing device (the mobile app) sends a HTTP response with the token, which from that point on is considered a session token, and a local IP session (representing the secure connection) is considered established.

In a scenario when direct connectivity fails, a connection through the relay server (global node) can be used. Address spaces may be compared by checking the subnet.

Possible implementations for using the disclosed method are the following:

1. Healthcare 1.1 Clinical Image Acquisition

Using this technology, it is possible to make a modern smartphone into a capture device for clinical images, taken for example in the doctor's office. Through the synchronized context be automatically associated with the patient's records in a PACS (picture archive and communication system, i.e. a central digital image storage facility for storing medical image data about patients) or in an EMR (Electronic Medical Record) system. The EMR system would essentially notify the phone in real time as the context of the patient changes, and whenever the phone would take an image the image would automatically appear in the correct patient section of the EMR. The same can be applied to creation of additional documentation in the operating room.

Without the present invention, there would either have to be a physical connection, such as a cable or Bluetooth, or some large scale process. The advantage of the proposed implementation is there is a secured and trusted peer to peer session between the computer running the EMR system, and the phone at a point to point level. Therefore the authentication context and patient context can be automatically managed.

1.2 Collection of Patient Data

Many different devices collect health related data. However, data from those devices typically ends up in different places, where ultimately not accessible to healthcare providers and medical research purposes. Healthcare providers could benefit from access to such information. The field of wearable devices with Bluetooth connection has been growing extremely fast, and soon there will be wearable devices that will be able to monitor all the basic vitals, plus probably blood sugar, and saturation, hemoglobin levels, home based spirometry (which would like save millions of people).

Provided a simple, effective way to transmit that data, possibly with the patient's permission, could potentially change medicine, because physicians would have access to vast new amounts of quality digital formatted information that to date simply does not exist.

With this invention, with a simple physical scan, and installation of appropriate application, a patient can transmit information from his/her phone to the hospital patient record system, in a simple, secure, one time, or several patient initiated sessions over time, with no additional authentication and matching steps.

This would involve an initial session setup in the physician office, populating the patient's phone with a unique identifier which could match that phone to a particular patient record in the hospital information system.

Such a procedure is not possible according to the state of the art. It has taken many years to develop today's existing, albeit difficult, way of associating a particular patient with a particular set of credentials for the purpose of access to medical data. This invention provides a solution for proving identity by credentials stored on a device of the user. As an example scenario, let's say we have a healthcare professional, in front of a patient, whose identification has already been checked by other means, during provisioning process, armed with electronic medical record application on some device, and now the connection can happen on a device to device/server level in a fully authenticated run time fashion. The necessary data collected on the mobile devices will be transferred, from there on there can be a separate workflow process to do inter office visits uploads relying on methods described in this application for patient identifications.

The use of this architecture would allow in a context of an authenticated (e.g. medical) transaction, create a virtual channel between an application on the patient's phone, and the medical record application, transmit the data, and no traces left anywhere, provide an authenticated environments for secondary patient initiated uploads.

1.3 Multi-Purpose Remote Second Screen

Physicians in surgery use multiple types of devices with video and software outputs. Sometimes those devices are not conveniently located, or could provide greater usability when being close to the physician and be under his control. The new invention could allow to pair a specific off-the-shelf devices, or a group of devices with use of this technology, and allow synchronous application flow across several device inputs. This can happen right next to the surgical field. If devices are connected on the same WiFi where they could have direct access to each other, they could benefit from extremely fast update times making live video streaming from, for example, a microscope to an initiating node.

1.4 Zero Footprint Physician Briefcase

Access to secure protected health care data by physicians has always been challenging as it is a possible security breach. Once a physician is in authenticated app, with fingerprint and or other means, with use of this technology, the patient and data context can be transmitted to another device, and ultimately to another web application server from the cloud or a mobile device, depending on specific implementation. This would allow physician's access on any internet enabled computer in the world to their patients, and their data.

1.5 Distribution of Medical Data to the Patient

Often healthcare facilities need to provide medical data to the patient. In most instances, it is a CD with some DICOMS (format for digital imaging and communications in medicine) and PDF (portable document format) document, as well as printed information. Using this technology, the patient data such as patient records, data from particular imaging device can be transferred straight to the mobile phone of the patient, some example are three-dimensional ultrasound images, endoscopically obtained videos, with one physical step data can be securely transferred, the use of this method as opposed to a static QR would enable to have a certainty that a study has been handed over to the patient, and provide additional means of feedback. But the real value of this technology comes after, when it allows showing the data to someone else in one physical step.

2. Payments

2.1 Purchase of Voice Talk Minutes in a Scenario where a User Can Buy "Taking Time" for his Pre-Paid Mobile Phone A typical scenario in which the present invention can be used will be walking up to a machine, or a store interface, deposit money within cash register by scan of a QR code, and have the money credited to account, without anything physical given that can be lost, stolen etc. Using this technology, we can establish a secure encrypted session, knowing that (a) the scan was performed by authorized application/device, (b) the connecting device has actually scanned the QR code.

2.2 Security

With use of this technology, a virtual command center can be created with use of several tablet devices synchronized in the same content. Each one of those devices can present different video streams, and provide touch interface to engage or disengage certain system components, such as gates, conveyor belts, control temperature, voltage etc.

3. Content Creation and Digital Learning

3.1 Virtual Studio

Several devices can be coupled into a network, one device for example a tablet or notebook computer serves as a control center, and several other tablet and phone devices are used as capture devices. This ultimately creates a virtual studio experience. Computers can also be coupled, and can provide applications such as screen capture.

3.2 Multi Device Playback

In the online course market, there is an ongoing challenge of student engagement with the courses. Part of the fundamental challenge is when replacing a classroom experience with an on screen experience, we are fundamentally much more limited, in terms of available contexts to reference from, in order to understand when and what is being talked about.

So specifically in computer skills, which has become a big part of the overall eLearning initiative, one continuously has to switch between the context of the software one is learning and exercising with, and the video. The video within of itself also contains different sub-streams of data, such as a power point presentation, actual software window, prints or pieces of important code or other data that you might need to see visually during the learning process. Doing this without this would require each device to login separately, there has to be some logic on the servers to allow locating the right session on the right server, and somehow synchronizing the data.

4. Gaming

Devices could be paired and used in a context of both cloud and desktop gaming. Devices paired through this architecture would enjoy seamless one step connectivity of any device having downloaded the app (application), to a game in one physical step.

The invention relates to the following exemplary embodiments:

A. A computer-implemented method for establishing a secure connection between two electronic computing devices which are located in a network environment, the two electronic computing devices being a first computing device offering the connection and a second computing device designated to accept the connection, the method comprising executing, by at least one processor of at least one computer, a connection-establishing application, wherein execution of the connection-establishing application causes the at least one processor of the at least one computer steps of:

a) generating an ephemeral private key by the connection-establishing application and deriving its ephemeral public key, and generating a unique ID by means of the connection-establishing application;

b) submitting the unique ID to a trusted server for an additional signature with the private key matching a publicly trusted certificate associated with the trusted server;

c) sending back the signed unique ID to the first computing device;

d) registering a virtual endpoint on a relay server with the signed unique ID, whereby the signed unique ID becomes a signed unique ID of the virtual endpoint;

e) acquiring, at the second computing device and from the first computing device, an information packet comprising information about:
  i. a network configuration of the first computing device comprising
    2. the signed unique ID of the virtual endpoint on the relay server; and
    3. an address of the relay server;
  ii. the ephemeral public key;
    i. iii. a fully qualified domain name of the trusted server; and
    ii. iv. a signature associated with the signed unique ID;

f) determining, by the second computing device, whether the signature associated with the signed unique ID is valid and trusted;

g) if this signature check (step f)) results in that the unique ID signature is valid and trusted, establishing a connection from the second computing device to the first computing device via the virtual endpoint by means of a transparent relay through the relay server;

h) receiving, at the first computing device and from the second computing device, an information packet response being a response of the second computing device to the acquisition of the information packet, wherein the information packet response is encrypted with the ephemeral private key, and wherein the information packet response is transferred through the relay server by the second computing device and decrypted using the ephemeral private key, wherein the information packet response contains the following:
  i. the address of the relay server;
  ii. a unique authorization token (e.g. unique sender constrained authorization token), usage of which requires proof of possession of the ephemeral key, which is located on the first computing device;
  iii. a cryptographic checksum of a publicly trusted certificate associated with the second computing device and a private key corresponding to the publicly trusted certificate associated with the second computing device, with the address of the relay server address contained in the common name or alternate names of the publicly trusted certificate associated with (e.g. the private key of) the second computing device; and
  iv. a signature generated using the private key corresponding to the publicly trusted certificate associated with the second computing device, the signature signing the address of the relay server, the unique authorization token and the cryptographic checksum of the publicly trusted certificate associated with the second computing device;

i) determining, by the first computing device, whether the publicly trusted certificate associated with the second computing device is valid;

j) verifying the signature contained in the information packet response by validating the signature contained in the information packet response against a public key obtained from a publicly trusted certificate, which publicly trusted certificate has been retrieved from a trusted source;

k) if the verification of the information packet response results in that the information packet is valid, initiating a secure connection to the second computing device;

l) providing a proof of possession of the ephemeral private key by generating a signature signing, with the ephemeral private key, information shared between the first computing device and the second computing device;

m) accepting, by the second computing device, the connection, and allowing, by the second computing device, further data exchange between the two computing devices, by executing the following steps:

i. receiving, at the second computing device, a hypertext transfer protocol secure request with the unique authorization token;

ii. verifying the proof of possession of the ephemeral private key by verifying the signature generated by signing the shared information, and thereby granting permanent means of authentication, namely a session token signed with the private key corresponding to the publicly trusted certificate associated with the second computing device, and granting access to resources available by means of the second computing device; and iii. authorizing, by the second computing device, the secure connection from the first computing device.

B. The method according to embodiment A, wherein the second computing device is a mobile electronic device such as a smartphone or a tablet computer.

C. The method according to embodiment B, wherein the mobile electronic device includes a digital electronic processor and an optical image acquisition unit operatively coupled to the processor of the mobile electronic device and wherein the first computing device is operatively coupled to a display device, wherein the first computing device causes the display device to display a two-dimensional graphical code such as a QR code or barcode representing the information packet, the method comprising:

generating, by the mobile electronic device, the information packet based on digital image data obtained by scanning, with the image acquisition unit, the graphical code displayed on the display device.

D. The method according to any one of embodiments A to C, wherein, if steps h) or i) or a combination thereof results in that the information packet response cannot be decrypted with the ephemeral private key of the first computing device; or results in a non-valid and non-trusted identity of the second computing device, then further data exchange is prohibited between the first computing device and the second computing device, and the connection is terminated.

E. The method according to any one of embodiments A to D, comprising executing, by the at least one processor of the at least one computer, a step of transmitting digital data between the first computing device and the second computing device via the secure connection.

F. The method according to any one of embodiments A to E, wherein the first computing device and the second computing device are located in separate network spaces which are separated from each other through at least one of a firewall, proxy server and/or NAT or other similar restrictive means so that no direct connection initiation is possible, and wherein method comprises:

establishing a connection between the second computing device and the relay server, wherein all data exchanged between the first computing device and the second computing device is routed via the relay server, wherein all data transmitted between the first computing device and the second computing device is asymmetrically encrypted using either the ephemeral public key or the public key corresponding to the publicly trusted certificate associated with the second computing device depending on the direction of communication.

G. The method according to any one of embodiments A to F, wherein the first computing device and the second computing device share a network space, and wherein all data exchanged between the first computing device and the second computing device is routed directly between the first computing device and the second computing device.

H. The method according to any one of embodiments A to G, wherein the first computing device causes the transmission of the information packet or trustworthy reference thereof by transmission of at least one of QR code, ultrasound code, Bluetooth connection, a near-field communication connection or barcode.

I. The method according to any one of embodiments A to H, wherein the second computing device is operative in a public mobile network operating on a standard such as 3G, 4G or 5G or in a private network (e.g. a wireless network in hospital).

J. The method according to embodiment I, wherein the private network is a local network.

K. The method according to any one of embodiments A to J, wherein the information packet response contains a CN (X.509/SSL certificate common name) which matches a certificate being allocated to second computing device.

L. The method according to any one of embodiments A to K, wherein the publicly trusted certificate, for example the TLS certificate, is an X509 certificate.

M. The method according to any one of embodiments A to M, comprising:

n) placing specific hypertext transfer protocol (HTTP) public key pinning headers into a hypertext transfer protocol response by the second computing device, and causing a web browser on the first computing device to remember the public key corresponding to the publicly trusted certificate associated with the second computing device matching the address of the relay server for preventing attacks in future sessions between the first computing device and the second computing device.

N. The method according to embodiment M, wherein the hypertext transfer protocol public key pinning headers are defined according to the RFC7469 standard.

O. The method according to any one of embodiments A to N, wherein the application is a web application.

P. The method according to any one of embodiments A to O, wherein the unique ID is a random unique ID.

Q. The method according to any one of embodiments A to P, wherein the trusted server is a hypertext transfer protocol secure server.

R. The method according to any one of embodiments A to Q, wherein the address of the relay server is a fully qualified domain name.

S. The method according to any one of embodiments A to R, wherein the virtual endpoint is secret and dynamically allocated.

T. The method according to any one of embodiments A to S, wherein the information packet and the information packet response contain a signed time stamp for further control of response validity.

U. The method according to any one of embodiments A to T, wherein the address of the relay server assigned to the second computing device is a fully qualified domain name.

V. The method according to any one of embodiments A to U, wherein the unique authorization token is part of a cryptographic challenge or just a message encrypted with the ephemeral public key.

W. The method according to any one of embodiments A to V, wherein the trusted source from which the publicly trusted certificate can be retrieved is an Origin server or Certificate Transparency Log or the Certification Authority issuing the certificate.

X. The method according to any one of embodiments A to W, wherein no initial web page download is required.

Y. The method according to any one of embodiments A to X, wherein the connection-establishing application is already stored on the two computing devices.

Z. The method according to any one of embodiments A to Y, wherein the connection-establishing application is simultaneously stored and executable on both of the two computing devices.

AA. The method according to any one of embodiments A to Z, wherein a web application is used to establish a connection to a trusted server from the first computing device, and the method comprises a step of downloading an application-specific webpage.

BB. The method according to embodiment AA, wherein the connection to the trusted server is established by means of a HTTPS/TLS protocol.

CC. The method according to any one of embodiments A to BB, wherein the ephemeral private key is frequently refreshed along with the information packet.

DD. The method according to embodiment CC, wherein the security is increased.

EE. The method according to any one of embodiments A to DD, wherein the unique authorization token is the information in the information packet response contains information that serves to verify a cryptographic identity of an electronically communicating electronic device.

FF. The method according to embodiment EE, wherein the unique token is the whole information packet response encrypted with the corresponding public key.

GG. The method according to any one of embodiments A to FF, wherein, if step j) results in that the signature contained in the information packet response is not valid or information decryption with the ephemeral private key does not result in valid decryption of data, or the endpoint has previously been associated with another computing device, or the information packet is expired, further data exchange between the first and second computing devices is prohibited, and the secure connection is dropped.

HH. A computer program, which, when executed by at least one processor of at least one computer or loaded into a memory of at least one computer, causes the at least one computer to execute the method according to any one of embodiments A to GG and/or a data stream which represents of the program, and/or a signal wave or a digital signal wave, carrying information which represents the program.

II. A non-transitory computer-readable program storage medium on which a program is stored, when running on a processor of at least one computer or when loaded into the memory of at least one computer, causes the at least one computer to perform the method according to any one of embodiments A to GG.

JJ. A system, comprising:
at least one computer comprising a processor and a memory; and
the program storage medium according to embodiment II, wherein
the at least one computer is configured to read the program from the program storage medium and execute the program.

KK. An electronic network system, comprising:
a) a first computing device and a second computing device; and
b) the system of embodiment JJ, wherein the at least one computer can be part of at least one of the first computing device and the second computing device.

The invention claimed is:

1. A computer-implemented method for establishing a secure connection between two electronic computing devices which are located in a network environment, the two electronic computing devices being a first computing device offering the connection and a second computing device designated to accept the connection, the method comprising executing, by at least one processor of at least one computer, a connection-establishing application, wherein execution of the connection-establishing application causes the at least one processor of the at least one computer to perform the steps of:
generating an ephemeral private key by the connection-establishing application and deriving its ephemeral public key, and generating a unique ID by means of the connection-establishing application;
submitting the unique ID to a trusted server for an additional signature with the private key matching a publicly trusted certificate associated with the trusted server;
sending back the signed unique ID to the first computing device;
registering a virtual endpoint on a relay server with the signed unique ID, whereby the signed unique ID becomes a signed unique ID of the virtual endpoint;
acquiring, at the second computing device and from the first computing device, an information packet comprising information about:
a network configuration of the first computing device comprising:
the signed unique ID of the virtual endpoint on the relay server; and
an address of the relay server;
the ephemeral public key;
a fully qualified domain name of the trusted server; and
the signature associated with the signed unique ID;
determining, by the second computing device, whether the signature associated with the signed unique ID is valid and trusted;
if the signature check of the prior determining step results in that the unique ID signature is valid and trusted, establishing a connection from the second computing device to the first computing device via the virtual endpoint by means of a transparent relay through the relay server;
receiving, at the first computing device and from the second computing device, an information packet response being a response of the second computing device to the acquisition of the information packet, wherein the information packet response is encrypted with the ephemeral public key, and wherein the information packet response is transferred through the relay server by the second computing device and decrypted using the ephemeral private key, wherein the information packet response contains the following:

the address of the relay server;

a unique authorization token;

a cryptographic checksum of a publicly trusted certificate associated with a private key of the second computing device, with the relay server address contained in the common name or alternate names of the publicly trusted certificate associated with the second computing device; and a signature generated using the private key corresponding to the publicly trusted certificate associated with the second computing device, the signature signing the address of the relay server, the unique authorization token and the cryptographic checksum of the publicly trusted certificate associated with the second computing device;

determining, by the first computing device, whether the publicly trusted certificate which has been retrieved from a trusted source and is associated with the second computing device is valid;

verifying the signature contained in the information packet response by validating the signature contained in the information packet response against a public key obtained from the publicly trusted certificate associated with the second computing device;

if the verification of the information packet response results in that the information packet is valid, initiating a secure connection to the second computing device;

providing a proof of possession of the ephemeral private key by generating a signature signing, with the ephemeral private key, information shared between the first computing device and the second computing device;

accepting, by the second computing device, the connection, and allowing, by the second computing device, further data exchange between the two computing devices, by executing the following steps:

receiving, at the second computing device, a hypertext transfer protocol secure request with the unique authorization token;

verifying the proof of possession of the ephemeral private key by verifying the signature generated by signing the shared information, and thereby granting permanent means of authentication, namely a session token signed with the private key corresponding to the publicly trusted certificate associated with the second computing device, and granting access to resources available by means of the second computing device; and authorizing, by the second computing device, the secure connection from the first computing device.

2. The method according to claim 1, wherein the second computing device is a mobile electronic device such as a smartphone or a tablet computer.

3. The method according to claim 2, wherein the mobile electronic device includes a digital electronic processor and an optical image acquisition unit operatively coupled to the processor of the mobile electronic device and wherein the first computing device is operatively coupled to a display device, wherein the first computing device causes the display device to display a two-dimensional graphical code such as a QR code or barcode representing the information packet, the method comprising:

generating, by the mobile electronic device, the information packet based on digital image data obtained by scanning, with the image acquisition unit, the graphical code displayed on the display device.

4. The method according to claim 1, wherein, if the step of receiving the information packet response or the step of determining whether the publicly trusted certificate is valid results in that the information packet response cannot be decrypted with the ephemeral private key of the first computing device; or results in a non-valid and non-trusted identity of the second computing device, then further data exchange is prohibited between the first computing device and the second computing device, and the connection is terminated.

5. The method according to claim 1, wherein the first computing device and the second computing device are located in separate network spaces which are separated from each other through at least one of a firewall, proxy server and/or NAT or other similar restrictive means so that no direct connection initiation is possible, and wherein method comprises:

establishing a connection between the second computing device and the relay server, wherein all data exchanged between the first computing device and the second computing device is routed via the relay server, wherein all data transmitted between the first computing device and the second computing device is asymmetrically encrypted using either the ephemeral public key or the public key corresponding to the publicly trusted certificate associated with the second computing device depending on the direction of communication.

6. The method according to claim 1, wherein the first computing device causes the transmission of the information packet or trustworthy reference thereof by transmission of at least one of QR code, ultrasound code, Bluetooth connection, a near-field communication connection or barcode.

7. The method according to claim 1, further comprising:

placing specific hypertext transfer protocol (HTTP) public key pinning headers into a hypertext transfer protocol response by the second computing device, and causing a web browser on the first computing device to remember the public key corresponding to the publicly trusted certificate associated with the second computing device matching the address of the relay server for preventing attacks in future sessions between the first computing device and the second computing device.

8. The method according to claim 1, wherein the virtual endpoint is secret and dynamically allocated.

9. The method according to claim 1, wherein the information packet and the information packet response contain a signed time stamp for further control of response validity.

10. The method according to claim 1, wherein the unique authorization token is part of a cryptographic challenge or just a message encrypted with the ephemeral public key.

11. The method according to claim 1, wherein, if the step of verifying the signature contained in the information packet response results in that the signature contained in the information packet response is not valid or information decryption with the ephemeral private key does not result in valid decryption of data, or the endpoint has previously been associated with another computing device, or the information packet is expired, further data exchange between the first and second computing devices is prohibited, and the secure connection is dropped.

12. A non-transitory computer readable medium including instructions, which, when executed by at least one processor of at least one computer, causes the at least one computer to execute the steps of:
- generating an ephemeral private key by the connection-establishing application and deriving its ephemeral public key, and generating a unique ID by means of the connection-establishing application;
- submitting the unique ID to a trusted server for an additional signature with the private key matching a publicly trusted certificate associated with the trusted server;
- sending back the signed unique ID to the first computing device;
- registering a virtual endpoint on a relay server with the signed unique ID, whereby the signed unique ID becomes a signed unique ID of the virtual endpoint;
- acquiring, at the second computing device and from the first computing device, an information packet comprising information about:
  - a network configuration of the first computing device comprising:
    - the signed unique ID of the virtual endpoint on the relay server; and
    - an address of the relay server;
  - the ephemeral public key;
  - a fully qualified domain name of the trusted server; and
  - the signature associated with the signed unique ID;
- determining, by the second computing device, whether the signature associated with the signed unique ID is valid and trusted;
- if the signature check of the prior determining step results in that the unique ID signature is valid and trusted, establishing a connection from the second computing device to the first computing device via the virtual endpoint by means of a transparent relay through the relay server;
- receiving, at the first computing device and from the second computing device, an information packet response being a response of the second computing device to the acquisition of the information packet, wherein the information packet response is encrypted with the ephemeral public key, and wherein the information packet response is transferred through the relay server by the second computing device and decrypted using the ephemeral private key, wherein the information packet response contains the following:
  - the address of the relay server;
  - a unique authorization token;
  - a cryptographic checksum of a publicly trusted certificate associated with a private key of the second computing device, with the relay server address contained in the common name or alternate names of the publicly trusted certificate associated with the second computing device; and
  - a signature generated using the private key corresponding to the publicly trusted certificate associated with the second computing device, the signature signing the address of the relay server, the unique authorization token and the cryptographic checksum of the publicly trusted certificate associated with the second computing device;
- determining, by the first computing device, whether the publicly trusted certificate which has been retrieved from a trusted source and is associated with the second computing device is valid;
- verifying the signature contained in the information packet response by validating the signature contained in the information packet response against a public key obtained from the publicly trusted certificate associated with the second computing device;
- if the verification of the information packet response results in that the information packet is valid, initiating a secure connection to the second computing device;
- providing a proof of possession of the ephemeral private key by generating a signature signing, with the ephemeral private key, information shared between the first computing device and the second computing device;
- accepting, by the second computing device, the connection, and allowing, by the second computing device, further data exchange between the two computing devices, by executing the following steps:
  - receiving, at the second computing device, a hypertext transfer protocol secure request with the unique authorization token;
  - verifying the proof of possession of the ephemeral private key by verifying the signature generated by signing the shared information, and thereby granting permanent means of authentication, namely a session token signed with the private key corresponding to the publicly trusted certificate associated with the second computing device, and granting access to resources available by means of the second computing device; and
  - authorizing, by the second computing device, the secure connection from the first computing device.

13. A system for establishing a secure connection between two electronic computing devices which are located in a network environment, comprising:
- at least one computer having at least one processor and an associated memory, the memory having stored instructions which, when executed by the at least one processor, are operable to;
- generate an ephemeral private key by the connection-establishing application and deriving its ephemeral public key, and generating a unique ID by means of the connection-establishing application;
- submit the unique ID to a trusted server for an additional signature with the private key matching a publicly trusted certificate associated with the trusted server;
- send back the signed unique ID to the first computing device;
- register a virtual endpoint on a relay server with the signed unique ID, whereby the signed unique ID becomes a signed unique ID of the virtual endpoint;
- acquire, at the second computing device and from the first computing device, an information packet comprising information about:
  - a network configuration of the first computing device comprising:
    - the signed unique ID of the virtual endpoint on the relay server; and
    - an address of the relay server;
  - the ephemeral public key;
  - a fully qualified domain name of the trusted server; and
  - the signature associated with the signed unique ID;
- determine, by the second computing device, whether the signature associated with the signed unique ID is valid and trusted;
- if the signature check results in that the unique ID signature is valid and trusted, establish a connection from the second computing device to the first computing device via the virtual endpoint by means of a transparent relay through the relay server;

receive, at the first computing device and from the second computing device, an information packet response being a response of the second computing device to the acquisition of the information packet, wherein the information packet response is encrypted with the ephemeral public key, and wherein the information packet response is transferred through the relay server by the second computing device and decrypted using the ephemeral private key, wherein the information packet response contains the following:

the address of the relay server;

a unique authorization token;

a cryptographic checksum of a publicly trusted certificate associated with a private key of the second computing device, with the relay server address contained in the common name or alternate names of the publicly trusted certificate associated with the second computing device; and a signature generated using the private key corresponding to the publicly trusted certificate associated with the second computing device, the signature signing the address of the relay server, the unique authorization token and the cryptographic checksum of the publicly trusted certificate associated with the second computing device;

determine, by the first computing device, whether the publicly trusted certificate which has been retrieved from a trusted source and is associated with the second computing device is valid;

verify the signature contained in the information packet response by validating the signature contained in the information packet response against a public key obtained from the publicly trusted certificate associated with the second computing device;

if the verification of the information packet response results in that the information packet is valid, initiate a secure connection to the second computing device;

provide a proof of possession of the ephemeral private key by generating a signature signing, with the ephemeral private key, information shared between the first computing device and the second computing device;

accept, by the second computing device, the connection, and allowing, by the second computing device, further data exchange between the two computing devices, by executing the following steps:

receive, at the second computing device, a hypertext transfer protocol secure request with the unique authorization token;

verify the proof of possession of the ephemeral private key by verifying the signature generated by signing the shared information, and thereby granting permanent means of authentication, namely a session token signed with the private key corresponding to the publicly trusted certificate associated with the second computing device, and granting access to resources available by means of the second computing device; and authorize, by the second computing device, the secure connection from the first computing device.

14. An electronic network system, comprising:

a first computing device and a second computing device; and the system of claim 13, wherein the at least one computer can be part of at least one of the first computing device and the second computing device.

* * * * *